United States Patent
Raybould et al.

(10) Patent No.: US 7,115,319 B2
(45) Date of Patent: *Oct. 3, 2006

(54) BRAZE-BASED PROTECTIVE COATING FOR SILICON NITRIDE

(75) Inventors: Derek Raybould, Denville, NJ (US); Chien-Wei Li, Livingston, NJ (US); Thomas E. Strangman, Prescott, AZ (US); Bjoern Schenk, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 346 days.

This patent is subject to a terminal disclaimer.

(21) Appl. No.: 10/682,752

(22) Filed: Oct. 8, 2003

(65) Prior Publication Data

US 2005/0079343 A1 Apr. 14, 2005

(51) Int. Cl.
*B32B 18/00* (2006.01)
*B32B 15/04* (2006.01)
(52) U.S. Cl. ............ 428/450; 428/446; 428/448; 428/336; 428/698; 428/701; 428/702; 228/262.9
(58) Field of Classification Search ............ None
See application file for complete search history.

(56) References Cited

U.S. PATENT DOCUMENTS

| | | | |
|---|---|---|---|
| 5,223,045 A * | 6/1993 | Priceman | 148/268 |
| 5,560,993 A | 10/1996 | Morimoto et al. | |
| 5,677,060 A | 10/1997 | Terentieva et al. | |
| 5,795,659 A | 8/1998 | Meelu et al. | |
| 6,126,758 A | 10/2000 | Meelu et al. | |
| 6,159,553 A | 12/2000 | Li et al. | |
| 6,332,926 B1 | 12/2001 | Pfaendtner et al. | |
| 6,582,779 B1 | 6/2003 | Li et al. | |
| 6,607,852 B1 * | 8/2003 | Spitsberg et al. | 428/702 |
| 2001/0055650 A1 | 12/2001 | Pfaendtner et al. | |
| 2002/0136835 A1 | 9/2002 | Li et al. | |
| 2003/0003328 A1 * | 1/2003 | Spitsberg et al. | 428/698 |
| 2003/0021901 A1 | 1/2003 | Gasse | |
| 2004/0219295 A1 * | 11/2004 | Perepezko et al. | 427/255.27 |
| 2005/0042461 A1 * | 2/2005 | Li et al. | 428/446 |

OTHER PUBLICATIONS

U.S. Appl. No. 10/621,981, filed Jul. 16, 2003, Li.
International Search Report filed Mar. 3, 2005.
Shirokane, et al., *Metalizing of silicon nitride ceramics*, Chemical Abstracts, vol. 106, No. 10, Mar. 9, 1987, Columbus, Ohio, US.

* cited by examiner

*Primary Examiner*—Jennifer C. McNeil
*Assistant Examiner*—Jason L. Savage
(74) *Attorney, Agent, or Firm*—Ingrassia Fisher & Lorenz

(57) ABSTRACT

A component comprising a silicon-based substrate and a braze-based protective coating disposed on the silicon-based substrate. The braze-based coating comprises a brazed layer, wherein the brazed layer comprises at least one intermetallic compound. A scale layer may be formed on the brazed layer. An environmental barrier coating may be disposed directly on the brazed layer or directly on the scale layer. A thermal barrier coating may be disposed on the environmental barrier coating. Methods for making a Si-based component having a braze-based protective coating are also disclosed.

37 Claims, 4 Drawing Sheets

BRAZE-BASED PROTECTIVE COATING FOR SILICON NITRIDE

BACKGROUND OF THE INVENTION

The present invention generally relates to a braze-based protective coating for a Si-based substrate. The present invention also relates to components having a braze-based protective coating, and to methods of making such components.

Hot section components, such as blades, bladed disks (blisks), nozzles, turbine shrouds, and combustors, made from silicon-based materials, such as silicon nitride ($Si_3N_4$), silicon carbide (SiC), and their composites, have the potential to increase the operating temperatures of gas turbine engines, as compared with Ni-based superalloys. However, in the gas turbine environment, such silicon-based materials are prone to excessive oxidation to form a silica layer, and the subsequent rapid loss of the silica layer. The silica layer reacts with water vapor in the combustion gas environment to form a volatile $Si(OH)_4$ species. The combination of excessive oxidation of silicon-based components and continual thinning of the resulting silica layer by $Si(OH)_4$ evaporation leads to recession of the components, reduced load-bearing capability, and shortened lifetime.

Attempts have been made to inhibit oxidation of silicon-based components by applying an environmental barrier coating to prevent direct exposure of the silica layer or substrate to oxygen and water vapor in the gas turbine engine environment. However, reaction of the silica layer with constituents of the environmental barrier coating (EBC) at the substrate-EBC interface degrades the protective property of the silica layer. Similarly, the silica layer may be degraded by reaction with constituents of the substrate with which it may be in contact. Further, silica layers of the prior art which are in direct contact with Si-based substrates continue to grow in thickness until through-thickness cracks develop, this may lead to spallation of an entire environmental barrier coating.

Prior art processes for coating silicon-based substrates, such as plasma spray and electron beam-physical vapor deposition (EB-PVD), are expensive. Further, such line-of-sight coating processes are not suited to depositing a uniform coating on substrates of complex geometry, such as multi-airfoil components (e.g., integral nozzles and integral turbine wheels, or blades).

Thus, there is a need for a high temperature (>2200° F.) oxidation barrier for Si-based gas turbine engine components. There is an additional need for a protective coating for a Si-based substrate, wherein the protective coating includes an oxidation barrier disposed on the Si-based substrate, and an environmental barrier coating disposed on the oxidation barrier. There is also a need for a low cost process for forming a dense, uniform layer of the oxidation barrier on a Si-based component of complex geometry, such as an integral nozzle or an integral turbine bladed disk (blisk).

SUMMARY OF THE INVENTION

In one aspect of the present invention, there is provided a component including a silicon-based substrate and a braze-based coating disposed on the silicon-based substrate. The braze-based coating includes a brazed layer disposed directly on the silicon-based substrate. The brazed layer includes an intermetallic compound, wherein the intermetallic compound comprises silicon (Si) and an element such as tantalum (Ta), molybdenum (Mo), scandium (Sc), ytterbium (Yb), or yttrium (Y).

In another aspect of the present invention, there is provided a component comprising a silicon-based substrate and a braze-based coating disposed on the silicon-based substrate. The protective coating comprises a brazed layer disposed on the silicon-based substrate, an environmental barrier coating disposed on the brazed layer, and a thermal barrier coating disposed on the environmental barrier coating. The brazed layer provides a barrier to the diffusion of oxygen therethrough. The brazed layer is also a barrier to diffusion of sintering oxides from the substrate into the coating.

In still another aspect of the present invention, there is provided a component comprising a silicon-based substrate, and a braze-based coating disposed on the silicon-based substrate. The braze-based coating includes a brazed layer disposed directly on the silicon-based substrate, a scale layer disposed on the brazed layer, an environmental barrier coating disposed on the scale layer, and a thermal barrier coating disposed on the environmental barrier coating. The brazed layer includes an intermetallic compound such as $TaSi_2$, $Ta_5Si_3$, $Ta_2Si$, $MoSi_2$, $Mo_5Si_3$, $ScSi$, $Sc_5Si_3$, $YbSi$, $YbSi_{1.8}$, $Yb_3Si_5$, $Yb_5Si_3$, $YSi$, $Y_3Si_5$, and $Y_5Si_3$. The brazed layer may also contain a dispersion of $Si_3N_4$ particles, or $Si_2ON_2$ particles, or a mixture thereof.

In yet another aspect of the present invention, there is provided a protective coating for a silicon-based substrate, wherein the protective coating includes a brazed layer, and a scale layer disposed on the brazed layer. The brazed layer includes an intermetallic compound comprising Si and an element such as Ta, Mo, Sc, Y, or Yb. The brazed layer may also contain a dispersion of $Si_3N_4$ particles, or $Si_2ON_2$ particles, or a mixture thereof.

In another aspect of the present invention, there is provided a method for making a component, the method comprising: providing a silicon-based substrate, depositing a braze mixture on a surface of the silicon-based substrate, and forming a brazed layer on the silicon-based substrate. The brazed layer comprises an intermetallic compound.

In a further aspect of the present invention, there is provided a method for making a component, the method comprising: providing a silicon-based substrate; depositing a braze mixture on a surface of the silicon-based substrate, wherein the braze mixture includes Si powder and at least one element such as Ta, Mo, Sc, Y, or Yb; and heating the braze mixture and the silicon-based substrate under a controlled atmosphere to form a brazed layer on the surface of the silicon-based substrate. The brazed layer may be formed by reacting constituents of the braze mixture to provide an intermetallic compound, wherein the intermetallic compound includes Si and an element such as Ta, Mo, Sc, Y, and Yb. The brazed layer may also contain a dispersion of $Si_3N_4$ particles, or $Si_2ON_2$ particles, or a mixture thereof.

In yet a further aspect of the present invention, there is provided a method for making a component, the method comprising: providing a silicon-based substrate; depositing a braze mixture on a surface of the silicon-based substrate, wherein the braze mixture comprises Si and an element such as Ta, Mo, Sc, Yb, and Y, and an optional dispersion of $Si_3N_4$ particles or $Si_2ON_2$ particles; heating the braze mixture and the silicon-based substrate to form a brazed layer on the silicon-based substrate, wherein the brazed layer comprises an intermetallic compound and free Si; and oxidizing at least one constituent of the brazed layer to form a scale layer on the brazed layer. The scale layer may comprise $Si_2ON_2$, $SiO_2$, or a mixture thereof, and at least one silicate of Ta, Sc, Yb, or Y.

In still a further aspect of the present invention, there is provided a method for making a component, the method including: providing a silicon-based substrate; depositing a braze mixture on a surface of the silicon-based substrate, wherein the braze mixture comprises Si, an element such as Ta, Mo, Sc, Yb, and Y, and a dispersion of silicon nitride or silicon oxynitride particles; heating the braze mixture and the silicon-based substrate to form a brazed layer on the silicon-based substrate, wherein the brazed layer comprises an intermetallic compound, free Si, and a dispersion of silicon nitride or silicon oxynitride particles; and oxidizing at least one constituent of the brazed layer to form a scale layer on the brazed layer, wherein the scale layer comprises $Si_2ON_2$, $SiO_2$, or a mixture thereof, and at least one silicate of an element such as Ta, Sc, Yb, and Y.

In yet another aspect of the present invention, there is provided a method for making a component, the method including: providing a silicon-based substrate; depositing a braze mixture on a surface of the silicon-based substrate, wherein the braze mixture comprises Si, an element such as Ta, Mo, Sc, Yb, and Y, and a dispersion of silicon nitride or silicon oxynitride particles; forming an environmental barrier coating on the brazed layer; and forming a thermal barrier coating on the environmental barrier coating.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a component, such as for a gas turbine engine, wherein the component may comprise a Si-based substrate. The component may have a braze-based protective coating disposed on the Si-based substrate. The braze-based protective coating may comprise a brazed layer disposed directly on the Si-based substrate, and optionally a scale layer disposed directly on the brazed layer. The braze-based protective coating may further comprise an environmental barrier coating disposed directly on the brazed layer, or disposed directly on the scale layer, when present. The braze-based protective coating may still further comprise a thermal barrier coating disposed on the environmental barrier coating.

The component may be, for example, an integral nozzle, an integral turbine wheel, a blade, a turbine shroud, or a combustor. The substrate may be, for example, a silicon carbide- or silicon nitride-based ceramic.

The present invention, in contrast to the prior art, provides a protective coating for a Si-based substrate, wherein the coating includes a brazed layer comprising an intermetallic compound. The intermetallic compound may be formed from a braze mixture comprising powdered Si and one or more metal elements. The brazed layer may be disposed directly on, and bonded to, the surface of the Si-based substrate. In some embodiments, the brazed layer may be resistant to oxidation, and may resist or minimize the formation of a thermally grown scale layer during exposure to oxygen, water vapor, and high temperatures associated with a gas turbine engine environment. In other embodiments, a scale layer may be formed directly on the brazed layer. The scale layer may be formed by a deposition process such as plasma spray coating, dip coating, sol-gel coating, chemical vapor deposition, physical vapor deposition, or electron beam-physical vapor deposition, or the scale layer may be thermally grown from the brazed layer. Both the brazed layer and the scale layer may prevent or minimize the diffusion of oxygen into the substrate. The brazed layer may further prevent or minimize the diffusion therein of constituents of the substrate.

Figure 1:
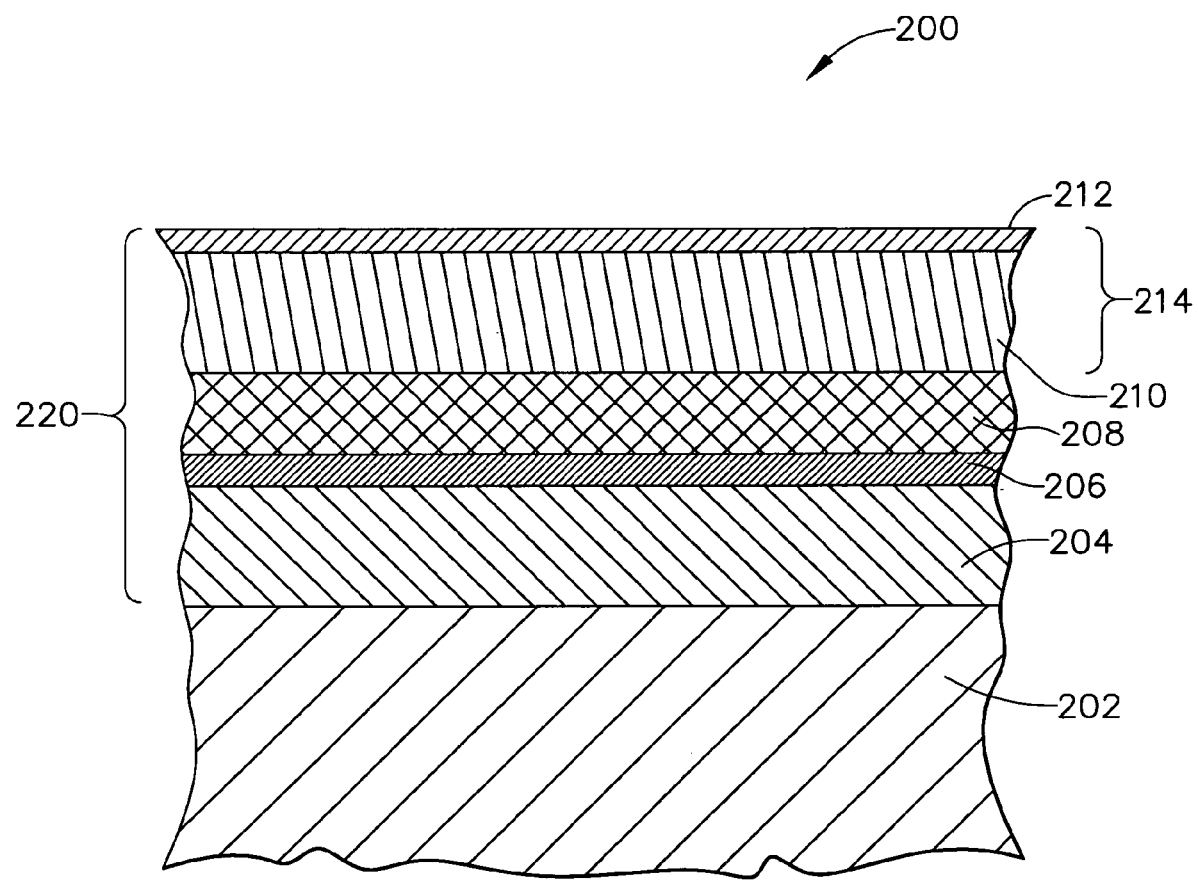
FIG. 1 schematically represents a sectional view of a component having a braze-based protective coating, according to the invention.

With reference to the drawings, FIG. 1 schematically represents a sectional view of a silicon-based component 200, according to one aspect of the invention. Component 200 may be a gas turbine engine component, e.g., an integral nozzle, an integral turbine wheel, a turbine shroud, a combustor, or a blade. Component 200 may include a silicon-based substrate 202. Silicon-based substrate 202 may comprise a silicon nitride- or a silicon carbide-based ceramic. Component 200 may have a protective braze-based coating 220 disposed on silicon-based substrate 202.

Braze-based coating 220 may include a brazed layer 204. Brazed layer 204 may be disposed directly on a surface of silicon-based substrate 202. Brazed layer 204 may comprise an intermetallic compound. Typically, such an intermetallic compound may be formed from a braze mixture applied to a surface of silicon-based substrate 202. Typically, the braze mixture may comprise silicon (Si metal) powder, in admixture with one or more elements such as Ta, Mo, Sc, Y, or Yb. Brazed layer 204 may comprise an intermetallic compound, such as $TaSi_2$, $Ta_5Si_3$, $Ta_2Si$, $MoSi_2$, $Mo_5Si_3$, ScSi, $Sc_5Si_3$, YbSi, $YbSi_{1.8}$, $Yb_3Si_5$, $Yb_5Si_3$, YSi, $Y_3Si_5$, or $Y_5Si_3$. The intermetallic compound may be formed by reacting Si with an element such as Ta, Mo, Sc, Yb, or Y provided in the braze mixture.

Typically, brazed layer 204 may comprise from about 10 to 100 wt. % of an intermetallic compound, usually about 20 to 95 wt. %, and often about 40 to 90 wt. %. Brazed layer 204 may be chemically compatible with the silicon-based substrate 202, and can be capable of preventing or inhibiting the diffusion of constituents of silicon-based substrate 202 into braze-based coating 220. Brazed layer 204 may have up to about 40 weight % silicon nitride ($Si_3N_4$) particles dispersed therein. The size of $Si_3N_4$ particles dispersed within brazed layer 204 may be in the range of from about 0.3 to 30 microns. In some embodiments, brazed layer 204 may include silicon oxynitride ($Si_2ON_2$) particles, or a mixture of $Si_3N_4$ and $Si_2ON_2$ particles, dispersed therein. Brazed layer 204 may have a thickness in the range of from about 2 to 100 microns (μm), usually about 5 to 50 microns, and often about 7 to 25 microns.

Again with reference to FIG. 1, in some embodiments braze-based coating 220 may optionally further include a scale layer 206 disposed directly on brazed layer 204. Scale layer 206 may have a thickness in the range of from about 0.1 to 20 microns, usually about 0.2 to 15 microns, and often about 0.5 to 5 microns. In some embodiments, scale layer 206 may be thermally grown by oxidation of one or more constituents of brazed layer 204. Scale layer 206 may comprise, for example, a complex oxide derived from oxidation of an intermetallic constituent of brazed layer 204. Scale layer 206 may additionally, or alternatively, comprise at least one metal oxide formed by oxidation of one or more unreacted constituents of the braze mixture applied to substrate 202. For example, if free Ta is present at the surface of brazed layer 204, $Ta_2O_5$ may be formed in scale layer 206. As another example, if free Si is present at the surface of brazed layer 204, scale layer 206 may comprise $SiO_2$. As yet another example, if $Si_3N_4$ particles are dispersed within brazed layer 204, scale layer 206 may comprise $Si_2ON_2$.

Both scale layer 206 and brazed layer 204 may comprise materials that are effective barriers to the diffusion of oxygen therethrough. Thus, both scale layer 206 and brazed layer 204 may serve as effective oxidation barriers to protect substrate 202 from excessive oxidation. As a result, silicon-based substrate 202 may be protected, by scale layer 206 and brazed layer 204, from oxygen in the environment. Consequently, oxygen induced changes in thickness and viscosity of scale layer 206 and brazed layer 204 can be avoided or minimized.

In some embodiments, scale layer 206 may be formed directly on brazed layer 204 by deposition of a pure layer of a material such as silica or silicon oxynitride, via a process such as plasma spray coating, high-velocity oxy fuel (HVOF) spraying, dip coating, sol-gel coating, chemical vapor deposition, physical vapor deposition, or electron beam-physical vapor deposition. Such deposition of scale layer 206 may be performed regardless of whether brazed layer 204 is capable of forming a scale layer of the same composition via oxidation of brazed layer 204.

In some embodiments, the braze mixture applied to substrate 202 may further include silicon nitride, in addition to Si and a metal element such as Ta, Mo, Sc, Y, or Yb. In the latter case, scale layer 206 may comprise silicon oxynitride derived from reacting thermally grown silica with the silicon nitride particle dispersion within the braze mixture. Silicon oxynitride particles may also be added to the braze mixture to facilitate nucleation and growth of the silicon oxynitride scale.

Component 200 may further include an environmental barrier coating 208. Environmental barrier coating 208 may be disposed directly on scale layer 206. In embodiments lacking scale layer 206, environmental barrier coating 208 may be disposed directly on brazed layer 204. Environmental barrier coating 208 may serve as a barrier to inhibit water vapor from reacting with the $SiO_2$ or $Si_2ON_2$ constituents of scale layer 206 and forming volatile $Si(OH)_4$ within braze-based coating 220.

Environmental barrier coating 208 may comprise, for example, $Ta_2O_5$ or $AlTaO_4$. In some embodiments, environmental barrier coating 208 may comprise at least about 50 mole % $AlTaO_4$, and the balance may comprise at least one oxide of an element selected from the group consisting of Ta, Al, Hf, Ti, Zr, Mo, Nb, Ni, Sr, Sc, Y, Mg, Si, and the rare earth elements including the lanthanide series of elements. Environmental barrier coating 208 may have a coefficient of thermal expansion (CTE) in the range of from about 2 to $7 \times 10^{-6\circ}$ $C.^{-1}$, and usually about 3.5 to $5 \times 10^{-6\circ}$ $C.^{-1}$. Environmental barrier coating 208 may have a thickness in the range of from about 5 to 500 microns. An environmental and thermal barrier coating for a Si-based component was described in U.S. Pat. Nos. 6,159,553 and 6,582,779, and in commonly assigned, co-pending U.S. patent application Ser. No. 10/621,981 entitled Environmental & Thermal Barrier Coating, filed Jul. 16, 2003, the disclosures of which are incorporated by reference herein in their entirety.

Component 200 may still further include a thermal barrier coating 214 disposed directly on environmental barrier coating 208. Thermal barrier coating 214 may serve as a barrier to heat, as well as to prevent or inhibit the ingress of particulates or corrosive materials into environmental barrier coating 208, thereby protecting underlying layers of protective coating 220 and substrate 202 from heat and corrosive materials. Thermal barrier coating 214 may include at least one segmented columnar ceramic layer 210. Segmented columnar ceramic layer(s) 210 may comprise a stabilized zirconia or a stabilized hafnia, such as cubic yttria stabilized zirconia or cubic yttria stabilized hafnia. The interface between environmental barrier coating 208 and thermal barrier coating 214 may be either compositionally discrete or graded.

Thermal barrier coating 214 may further include an outer, continuous, non-columnar sealant layer 212 disposed directly on segmented columnar ceramic layer 210. Sealant layer 212 may comprise a cubic stabilized zirconia or a cubic stabilized hafnia, such as cubic yttria stabilized zirconia and cubic yttria stabilized hafnia. Sealant layer 212 prevents penetration of extraneous materials into segmentation gaps (not shown) between columns of segmented columnar ceramic layer(s) 210. Thermal barrier coating 214 may have a thickness in the range of from about 1 to 60 mils. A thermal barrier coating for a component was described in U.S. Pat. Nos. 6,159,553 and 6,582,779, and in commonly assigned, co-pending U.S. patent application Ser. No. 10/621,981 entitled Environmental & Thermal Barrier Coating, filed Jul. 16, 2003, the disclosures of which are incorporated by reference herein in their entirety.

Figure 2A:
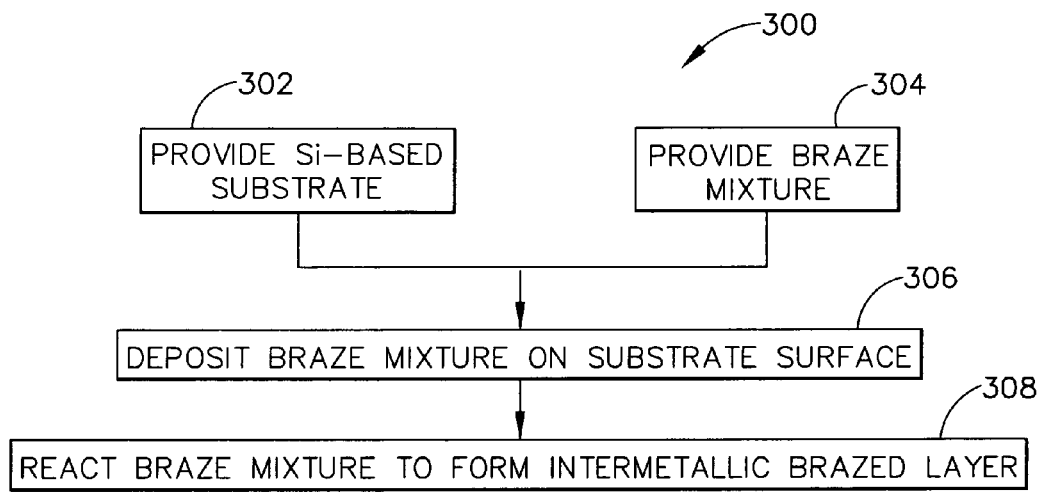
FIG. 2A schematically represents a series of steps involved in a method for forming a brazed layer on a silicon-based substrate, according to another embodiment of the invention.

FIG. 2A schematically represents a series of steps involved in a method 300 for forming a brazed layer on a silicon-based substrate, according to another embodiment of the invention. The silicon-based component may comprise a component for a gas turbine engine, such as an integral nozzle, an integral turbine wheel, a blade, a turbine shroud, or a combustor.

Step 302 may involve providing a silicon-based substrate. Such a silicon-based substrate may comprise a silicon nitride- or silicon carbide containing ceramic. In general, silicon nitride- and silicon carbide containing ceramics are well known in the art.

Step 304 may involve providing a braze mixture. Typically, the braze mixture may comprise silicon (Si metal) powder, in admixture with one or more elements such as Ta, Mo, Sc, Y, or Yb. As an example, the braze mixture may comprise from about 40 to 90 wt. % Ta, and from about 10 to 60 wt. % Si, and often from about 70 to 80 wt. % Ta, and from about 20 to 30 wt. % Si.

The braze mixture may comprise silicon (Si metal) powder in admixture with a primary co-constituent such as Ta, Mo, Sc, Y, or Yb, and a relatively minor amount of one or more secondary co-constituents, wherein the primary co-constituent may be capable of forming at least one intermetallic compound by reaction with Si. Although the formation of an intermetallic compound may primarily involve the reaction of co-constituents with Si metal provided in the braze mixture, reaction of co-constituents of the braze mixture with Si from the Si-based substrate is also possible under the invention.

The secondary co-constituent(s) of the braze mixture may comprise an element such as Ta, Mo, Sc, Y, or Yb. As an example, a braze mixture of the instant invention may comprise Si metal powder, tantalum (Ta) powder as the primary co-constituent, and a relatively minor amount of yttrium (Y) as a secondary co-constituent. In this example, the inclusion of a minor amount of Y with Si and Ta in the braze mixture lowers the melting temperature of the braze mixture but does not prevent the formation of the intermetallic $TaSi_2$. The formation of intermetallics from the braze mixture is described hereinbelow, for example, with reference to step 308 of the instant method. Various additives or dopants may also be included in the braze mixture, e.g., to change the braze temperature of the braze mixture.

The braze mixture may comprise a mixture of silicon (Si metal) powder and a primary co-constituent such as Ta, Mo, Sc, Y, and Yb, wherein the mixture of Si and Ta, Mo, Sc, Y, or Yb may comprise a eutectic mixture of Si with Ta, Mo, Sc, Y, or Yb. Alternatively, a braze mixture of Si with Ta, Mo, Sc, Y, or Yb may comprise a mixture having an excess of Ta, Mo, Sc, Y, or Yb as compared with the amount of Ta, Mo, Sc, Y, or Yb present in a corresponding eutectic mixture of Si and the primary co-constituent. In other embodiments, a braze mixture may have an excess of Si, such that free Si remains after formation of an intermetallic compound by reaction of the braze mixture to form the brazed layer (see, for example, method 300', FIG. 2B).

In some embodiments, the braze mixture applied to substrate 202 may include silicon nitride, silicon oxynitride, or mixtures thereof, in addition to Si metal powder and at least one metal element such as Ta, Mo, Sc, Y, or Yb.

Step 306 may involve depositing the braze mixture on the Si-based substrate. The surface of the Si-based substrate may be prepared, e.g., by cleaning with isopropanol, and the application of a binder material, prior to depositing the braze mixture thereon. The binder material may be a commercially available product, such as Nicrobraze Cement #520 (The Wall Colmonoy Corporation, Madison Heights, Mich.). The braze mixture may be applied to the surface of the Si-based substrate in an amount sufficient to provide a brazed layer of the desired thickness, e.g., broadly in the range of from about 5 to 100 microns. The braze mixture may be applied to the surface of the silicon-based substrate as a dry powder or as a paste. Alternatively, the braze mixture may be applied to the Si-based substrate by a thermal spray process, such as plasma spraying or HVOF, or by a physical vapor deposition process, such as electron beam-physical vapor deposition or sputtering.

Step 308 may involve reacting the braze mixture to form an intermetallic brazed layer. Prior to heating, the Si-based substrate and the braze mixture deposited thereon may be placed in a controlled atmosphere, such as an inert gas, or in a vacuum furnace. The temperature may then be increased to initiate reaction of the braze mixture to form an intermetallic-containing brazed layer on the Si-based substrate.

In some embodiments, step 308 may involve raising the temperature relatively slowly, e.g., at a rate of from about 5 to 10° C. per minute to a first temperature over a period of a few hours, wherein the first temperature may be below the melt temperature of the braze mixture. Thereafter, the temperature may be held at the first temperature for a period in the range of from about 5 to 30 minutes. Thereafter, the temperature may be increased relatively rapidly to a second, higher temperature, wherein the second temperature may be at or above the melt temperature of the braze mixture. For example, the temperature may be increased from the first temperature to the second temperature at a rate of from about 2 to 8° C. per minute, over a period of from about 5 to 15 minutes.

The first temperature may be, for example, in the range of from about 10 to 100° C. below the melt temperature of the braze mixture, usually about 30 to 70° C. below the melt temperature, and often about 40 to 60° C. below the melt temperature. The second temperature may be referred to as the braze temperature. The second temperature may be the melt temperature of the braze mixture. Alternatively, the second temperature may be higher than the melt temperature. The second temperature may be, for example, in the range of from about 5 to 40° C. above the melt temperature, usually about 10 to 30° C. above the melt temperature, and often about 20 to 30° C. above the melt temperature.

The temperature may be held approximately constant at or about the second temperature for a period typically in the range of from about 0.5 to 30 minutes, usually about 2 to 30 minutes, and often about 5 to 20 minutes. The second temperature may be dependant on the composition of the braze mixture and the intermetallic that is formed. Typically, the second temperature may be in the range of from about 1100 to 1700° C., usually 1300 to 1600° C., and often about 1400 to 1500° C. At the second temperature, Si in the braze mixture may be molten and may wet the surface of the substrate. Si melts at about 1414° C., thus the second or braze temperature may be below the melting point of Si metal. Longer times and higher temperatures can result in evaporation of excess Si, especially in a vacuum furnace.

During the heat treatment of step 308, Si reacts with at least one other constituent of the braze mixture to form the brazed layer, wherein the brazed layer comprises at least one intermetallic compound. During the heat treatment of step 308, the brazed layer may become bonded to the substrate surface. Thereafter, the brazed layer and substrate may be allowed to cool, e.g., within a vacuum furnace, to ambient temperature.

As an example only, and not to limit the invention in any way, for a process of the invention which may use a braze temperature of about 1450° C., the heating regime or cycle of step 308 may be as follows:
1. ambient to 1385° C. in 3 hours;
2. hold at 1385° C. for 15 minutes;
3. 1385° C. to 1450° C. in 15 minutes;
4. hold at 1450° C. for 2 minutes;
5. furnace cool to ambient.

Each of these temperatures and times, and in particular the braze temperature and the time at the braze temperature (e.g., 1450° C. for 2 minutes as cited in item 4. of the above example), may be varied depending on, for instance, the composition of the braze mixture applied to the substrate, and the desired composition of the resultant brazed layer.

In some embodiments, for example, depending on the composition of the braze mixture, the heating regime, etc., the brazed layer formed in step 308 may consist essentially of an intermetallic compound. In some embodiments, the composition of the braze mixture may be selected such that the presence of a continuous molten silicon phase during step 308 is transient. Such a situation may be achieved by selecting a braze mixture containing sufficient primary co-constituent, e.g., Ta, to react with almost all of the Si metal in the braze mixture.

As an example, under appropriate conditions, a braze mixture containing about 75 wt. % Ta powder and about 25 wt. % Si powder reacts to form the high melting temperature (2040° C.) $TaSi_2$ phase, with little or no free Si remaining. In this manner, a brazed layer having a high melting temperature, e.g., above 2000° C., may be formed from a mixture having a melt temperature of about 1400° C. Some of the intermetallic compounds that may be formed in the brazed layer from braze mixtures comprising Si and various metal elements are listed, together with their melting temperature, in Table 1.

TABLE 1

Intermetallics Formed from Braze Mixtures of Si with Various Metal Elements

| Metal Element | Approx. Melt Temperature of Braze Mixture | Intermetallic Reaction Product(s) | Approx. Melt Temperature of Intermetallic Product(s) |
|---|---|---|---|
| Tantalum (Ta) | 1400° C. | $TaSi_2$ | 2040° C. |
| Scandium (Sc) | 1155–1400° C. | ScSi; $Sc_5Si_3$ | 1785° C.; 2060° C. |
| Ytterbium (Yb) | 1425° C. | YbSi; $YbSi_{1.8}$ | >2000° C. |
| Yttrium (Y) | 1250° C. | YSi; Y3Si5; Y5Si3 | 1800° C. |

After reaction of Si with at least one other constituent of the braze mixture to form an intermetallic compound, any remaining free Si may be removed, e.g., by evaporation in the vacuum furnace. Alternatively, free Si may be oxidized to form a $SiO_2$ scale layer on the brazed layer (e.g., as described hereinbelow with reference to step 406 of method 400 (FIG. 3)). When the brazed layer contains a dispersion of $Si_3N_4$ particles, subsequent oxidation may produce a $Si_2ON_2$ scale on the brazed layer. In some embodiments, the brazed layer may contain a dispersion of particles of $Si_2ON_2$, or a dispersion of a mixture of $Si_3N_4$ and $Si_2ON_2$.

Figure 2B:
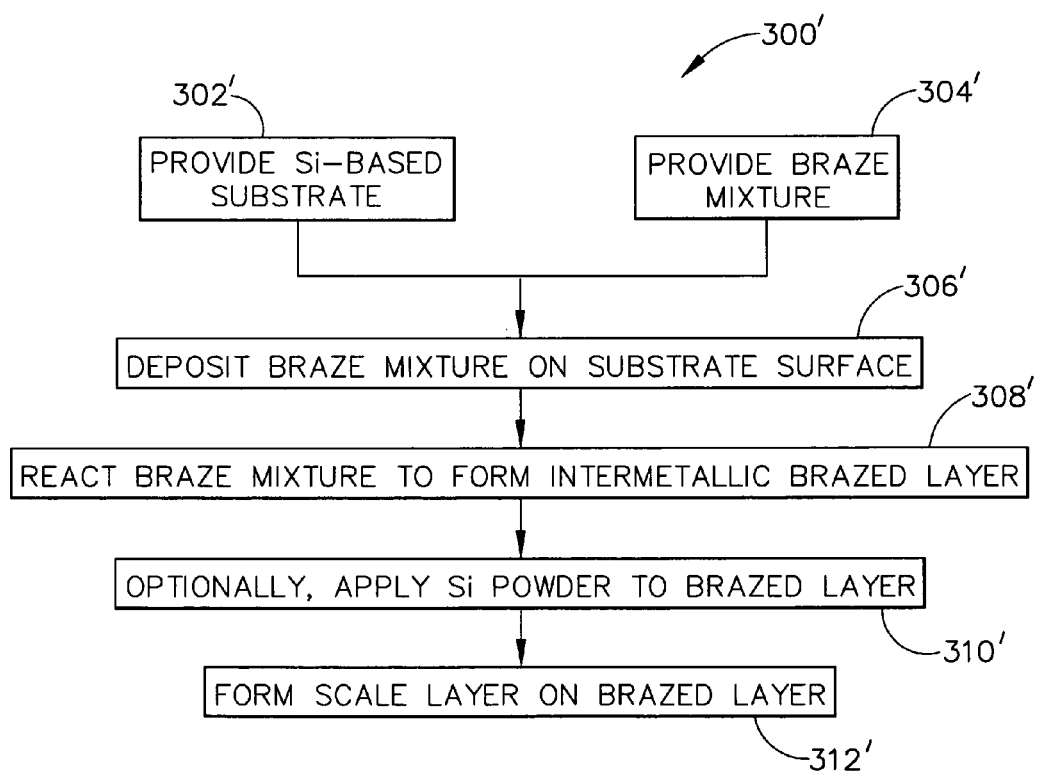
FIG. 2B schematically represents a series of steps involved in a method for forming a brazed layer and an oxidized scale layer on a silicon-based substrate, according to another embodiment of the invention.

FIG. 2B schematically represents a series of steps involved in a method 300' for forming a brazed layer on a silicon-based substrate and for forming an oxidized scale layer on the brazed layer, according to another embodiment of the invention. Step 302' may involve providing a silicon-based substrate, e.g., essentially as described for step 302 of method 300 (FIG. 2A).

Step 304' may involve providing a braze mixture. Typically, the braze mixture may comprise Si powder, in admixture with one or more powdered primary co-constituent elements, such as Ta, Mo, Sc, Y, or Yb. The braze mixture may have an excess of Si metal powder such that free Si remains in, or on, the brazed layer after reaction of Si with the primary co-constituent element to form an intermetallic compound. For example, in the case of scandium (Sc) as the primary co-constituent of the braze mixture, the braze mixture may comprise 50 wt. % or more of powdered Si and 50 wt. % or less of powdered Sc, such that excess Si metal remains after reaction to form ScSi in the brazed layer.

Step 306' may involve depositing the braze mixture on the Si-based substrate. The braze mixture may be applied to a surface of the silicon-based substrate essentially as described hereinabove with reference to step 306 of method 300 (FIG. 2A). Alternatively, the braze mixture may be applied to the Si-based substrate by a thermal spray process, such as plasma spraying or HVOF, or by a physical vapor deposition process, such as electron beam-physical vapor deposition or sputtering.

Step 308' may involve reacting the braze mixture to form an intermetallic brazed layer. The brazed layer may be formed by heating the Si-based substrate and the braze mixture in a controlled atmosphere, such as an inert gas, or in a vacuum furnace. For example, the materials may be heated in a vacuum furnace to a temperature in the range of from about 1100 to 1500° C. for a period of from about 1 to 15 minutes. During the heat treatment of step 308', Si reacts with at least one other constituent of the braze mixture to form the brazed layer, wherein the brazed layer comprises at least one intermetallic compound. During the heat treatment of step 308', the brazed layer may become bonded to the substrate surface. Thereafter, the brazed layer and substrate may be allowed to cool to ambient temperature.

Optional step 310' may involve applying powdered Si metal to the surface of the brazed layer formed in step 308'. In this manner, additional free Si is available for oxidation during step 312' (described hereinbelow).

Step 312' may involve oxidizing at least one constituent of the brazed layer to form a scale layer on the brazed layer. Step 312' may further involve oxidizing any Si powder applied to the surface of the brazed layer in step 310'. Step 312' may be performed by heating the brazed layer in air such that free Si in or on the brazed layer may be oxidized to form silica ($SiO_2$). The free Si may be excess Si remaining from the braze mixture provided in step 304', or Si powder applied to the brazed layer in optional step 310'.

In the case of Sc, Yb, and Y as constituents of the braze mixture, one or more silicates may also be formed as constituents of the scale layer, in addition to silica, during step 312'. For example, in the case of a ScSi-containing brazed layer formed from a braze mixture comprising 50 wt. % or more Si powder and Sc powder, excess free Si remains in the brazed layer after step 308'. The brazed layer may then be oxidized to form a scale layer comprising scandium silicate ($Sc_2SiO_5$) and scandium disilicate ($Sc_2Si_2O_7$) in addition to $SiO_2$. As an example, such oxidation of the brazed layer may be performed by heating in air at a temperature in the range of from about 1100 to 1500° C. for a period of from about 30 minutes to 6 hours.

Figure 3:
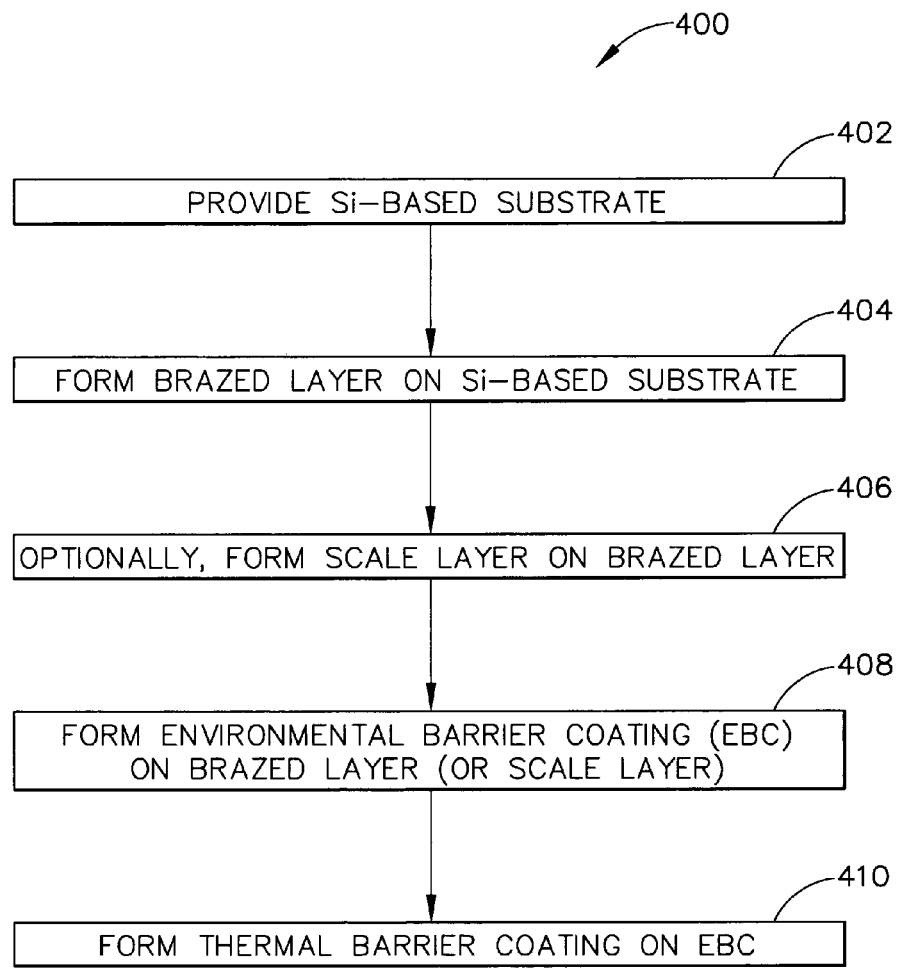
FIG. 3 schematically represents a series of steps involved in a method for making a silicon-based component having a braze-based protective coating, according to another embodiment of the invention.

FIG. 3 schematically represents a series of steps involved in a method 400 for making a silicon-based component having a braze-based coating, according to another embodiment of the invention.

Step 402 may involve providing a silicon-based substrate, e.g., essentially as described for step 302 (FIG. 2A). Step 404 may involve forming a brazed layer on a surface of the silicon-based substrate. The brazed layer may be formed essentially as described hereinabove, e.g., with reference to method 300 (FIG. 2A).

Optional step 406 may involve forming a scale layer on the brazed layer. The scale layer may be formed to a thickness in the range of typically from about 0 (zero) to 20 microns, usually about 0.2 to 15 microns, and often about 0.5 to 10 microns. In some embodiments, the scale layer may be thermally grown. For example, the scale layer may comprise a complex oxide derived from oxidation of an intermetallic component of the brazed layer. Or, the scale layer may comprise a simple oxide, such as silica or $Ta_2O_5$, which may be formed by oxidation of an unreacted constituent of the braze mixture applied to the substrate (e.g., as described with reference to method 300, FIG. 2A).

In some embodiments, the scale layer may comprise silicon oxynitride. A scale layer of silicon oxynitride may be formed from silicon nitride by at least two different process routes. For example, silicon nitride may be added to the braze mixture, and silicon oxynitride can be thermally grown from a reaction of this silicon nitride added to the brazed layer and the Si in the brazed layer. Alternatively, the brazed layer may comprise free Si, and the free Si can be converted to silicon nitride by a heat treatment under a nitrogen atmosphere.

In some embodiments, the scale layer may be deposited by various deposition processes, such as plasma spray coating, HVOF coating, dip coating, sol-gel coating, chemical vapor deposition, physical vapor deposition, or electron beam-physical vapor deposition. Such deposition processes are generally known in the art.

The scale layer, when present, may provide an effective barrier against the diffusion of oxygen into the underlying brazed layer and silicon-based substrate. The brazed layer may also provide an effective barrier against the diffusion of oxygen into the underlying silicon-based substrate, regardless of whether the scale layer is present.

Step 408 may involve forming an environmental barrier coating. The environmental barrier coating may be formed directly on the brazed layer, or may be formed directly on the scale layer, when present. The environmental barrier coating may be deposited using various deposition techniques well known in the art, e.g., by a process such as plasma spray coating, HVOF coating, dip coating, sol-gel coating, chemical vapor deposition, physical vapor deposition, or electron beam-physical vapor deposition.

The environmental barrier coating formed in step 408 may have the features, elements, or characteristics described hereinabove for environmental barrier coating 208 (FIG. 1). For example, the environmental barrier coating may comprise at least about 50 mole % $AlTaO_4$, and the balance may comprise at least one oxide of an element selected from the group consisting of Ta, Al, Hf, Ti, Zr, Mo, Nb, Ni, Sr, Sc, Y, Mg, Si, and the rare earth elements including the lanthanide series of elements. The environmental barrier may also comprise tantalum oxide alloyed with from about 4 to 10 mole % lanthanum oxide, or tantalum oxide alloyed with from about 1 to 6 mole % alumina. The environmental barrier coating may be deposited to a thickness in the range of from about 5 to 500 microns. An environmental and thermal barrier coating for a Si-based component was described in U.S. Pat. Nos. 6,159,553 and 6,582,779, and in commonly assigned, co-pending U.S. patent application Ser. No. 10/621,981), entitled Environmental & Thermal Barrier Coating, filed Jul. 16, 2003, the disclosures of which are incorporated by reference herein in their entirety.

Step 410 may involve forming a thermal barrier coating on the environmental barrier coating formed in step 408. As an example, the thermal barrier coating formed in step 410 may have the features, elements, or characteristics described hereinabove for thermal barrier coating 214 (FIG. 1). The thermal barrier coating may be deposited using various deposition techniques well known in the art, e.g., by a process such as plasma spray coating, HVOF coating, dip coating, chemical vapor deposition, physical vapor deposition, or electron beam-physical vapor deposition. Also note that the environmental barrier coating may be optional, particularly when minimal water vapor is present in the service environment. In this case, the thermal barrier coating may be deposited on the braze layer or the scale layer.

Figure 4:
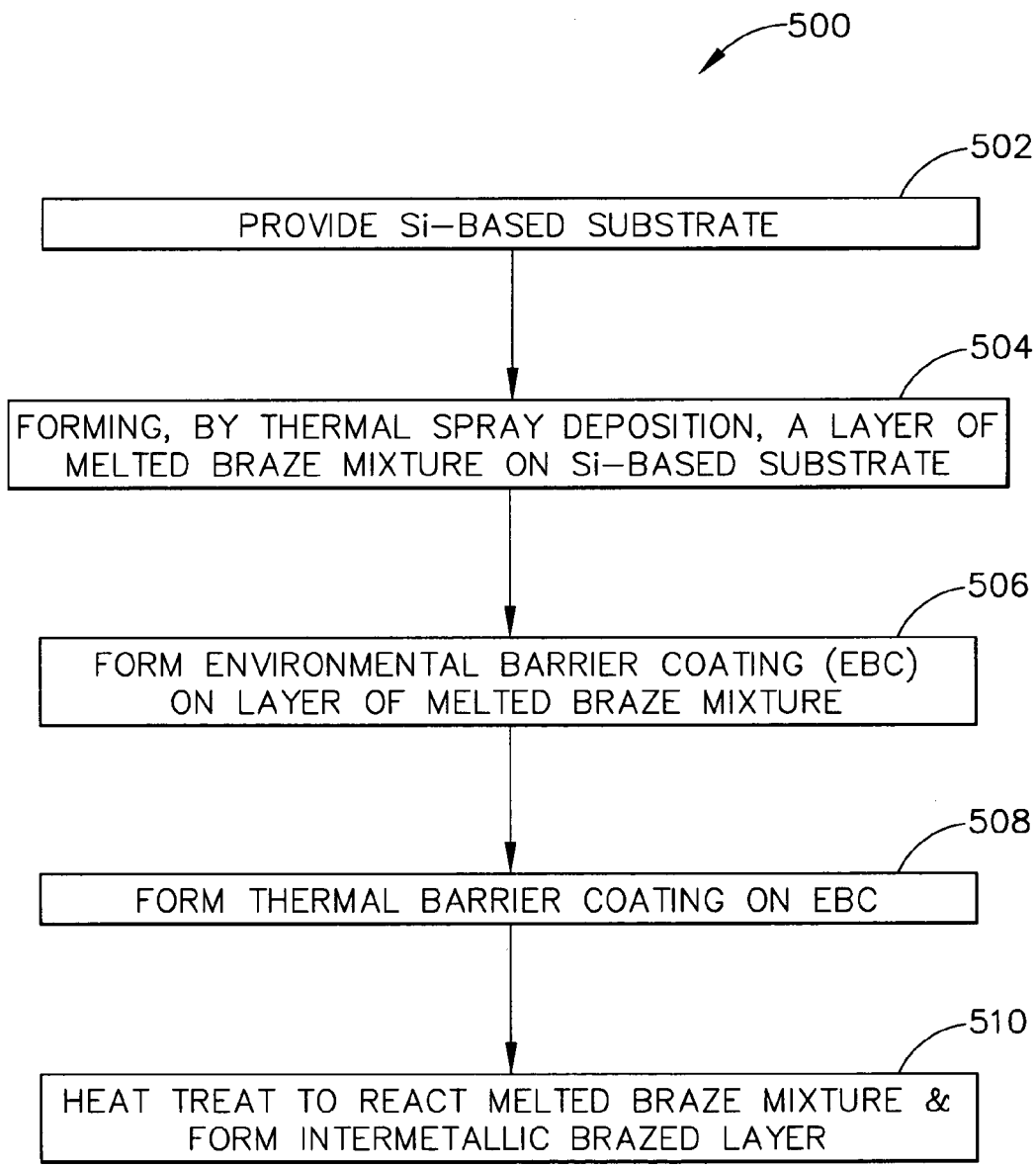
FIG. 4 schematically represents a series of steps involved in a method for making a silicon-based component having a braze-based protective coating, according to another embodiment of the invention.

FIG. 4 schematically represents a series of steps involved in a method 500 for making a silicon-based component having a braze-based protective coating, according to another embodiment of the invention. As an example, method 500 may be used to form a braze-based protective coating on a gas turbine engine component, such as a turbine shroud or combustor.

Step 502 may involve providing a Si-based substrate, for example, as described hereinabove with reference to step 402, FIG. 3. Step 504 may involve forming an incipient brazed layer, or a layer of melted braze mixture, on the Si-based substrate. As an example, a layer of melted braze mixture may be formed by depositing a braze mixture on the Si-based substrate by thermal spray deposition. The braze mixture deposited on the Si-based substrate may comprise Si powder in admixture with one or more powdered co-constituent elements, e.g., as described hereinabove with reference to steps 304, 304' of FIGS. 2A and 2B, respectively. During the deposition process of step 504, the braze mixture may not only melt, but also at least partially react to form one or more intermetallics. Electron beam-physical vapor deposition or sputtering may also be used to deposit elements of the brazed layer, such as Si and Ta, onto the substrate.

Step 506 may involve forming an environmental barrier coating on the layer of melted braze mixture/incipient brazed layer formed in step 504. The environmental barrier coating may be formed essentially as described hereinabove with reference to step 408, FIG. 3. Thereafter, step 508 may involve forming a thermal barrier coating on the environmental barrier coating. The thermal barrier coating may be deposited essentially as described hereinabove with reference to step 410, FIG. 3.

After step 508, step 510 may involve a post-coating heat treatment to induce further reaction of the melted braze mixture/incipient brazed layer to form one or more intermetallic phases within the brazed layer. As an alternative, or in addition, to such a post-coating heat treatment, further reaction of the layer of melted braze mixture may be induced by exposure to service conditions. After forming the environmental barrier coating and the thermal barrier coating, a thermally grown protective scale layer may also be formed between the brazed layer and the environmental barrier coating during post-coating exposure to an oxidizing environment (e.g., heat treatment or exposure to service conditions).

EXAMPLE 1

A braze mixture was formed by mixing tantalum powder and silicon powder in the ratio of 40 wt. % Ta to 60 wt. % Si. The powdered braze mixture had an average particle size of less than 44 microns (325 mesh). The surface of a silicon nitride substrate was prepared by cleaning in alcohol, followed by the application to the cleaned surface of a commercial binder material (Nicrobraze Cement #520, The Wall Colmonoy Corporation, Madison Heights, Mich.). The braze mixture was applied as the dry powder to the freshly applied binder, and the binder was then allowed to dry for about three hours. The braze mixture was applied in an amount per unit surface area of substrate sufficient to provide a brazed layer of the desired thickness, in this case about 20 microns.

The sample was placed in a vacuum furnace. After the pressure within the furnace fell to $10^{-4}$ Torr or lower, the temperature was raised to about 1450° C., and the temperature was maintained for a period of about 5 minutes. The sample was allowed to slowly furnace cool to provide a brazed layer on the substrate surface. Scanning electron microscopy confirmed a uniform coating of the brazed layer having a thickness of about 20 microns. X-ray analysis confirmed the presence of TaSi$_2$, and scanning electron microscopy showed some Si was also present, in the brazed layer. After removal from the furnace and inspection, the sample may be used as is, or the brazed layer may be oxidized to form a scale layer (Example 2).

A brazed layer formed on a silicon nitride substrate as described in this Example (and lacking a scale layer thereon) survived cyclic oxidation for over 400 hours in air with a 30 minute cycle time comprising 27 minutes at 2400° F./3 minutes at ambient temperature.

EXAMPLE 2

A brazed layer formed on a silicon nitride substrate (e.g., according to Example 1) was heated in air to a temperature of 1200 to 1350° C. for 0.5 to 8 hrs in order to oxidize one or more constituents of the brazed layer to form a scale layer on the brazed layer. In particular, free Si of the brazed layer was oxidized to SiO$_2$ to form a silica scale layer disposed directly on the brazed layer.

The brazed layer of braze-based protective coatings as described herein for coating Si based substrates has been modified from the simple brazes of the prior art in order to improve its oxidation- and corrosion protection characteristics. These modifications are also of benefit in situations where the compositions of the brazed layer of the present invention may be used as a braze for joining together two or more components. Therefore, it is to be understood that the braze-based compositions of the present invention may be advantageously used as a braze for joining together components, for elevated temperature applications (e.g., up to about 2400° F.), for example, for joining together ceramic components, such as Si based components.

It should be understood, of course, that the foregoing relates to embodiments of the invention and that modifications may be made without departing from the spirit and scope of the invention as set forth in the following claims.

We claim:

1. A component, comprising:
   a silicon-based substrate; and
   a braze-based coating disposed on said silicon-based substrate, wherein said braze-based coating comprises:
   a brazed layer comprising an intermetallic compound dispersion of silicon nitride particles, silicon oxynitride particles, or a mixture thereof, wherein said brazed layer provides a barrier to the diffusion of oxygen therethrough.

2. The component of claim 1, wherein said intermetallic compound is selected from the group consisting of TaSi$_2$, Ta$_5$Si$_3$, Ta$_2$Si, MoSi$_2$, Mo$_5$Si$_3$, ScSi, Sc$_5$Si$_3$, YbSi, YbSi$_{1.8}$, Yb$_3$Si$_5$, Yb$_5$Si$_3$, YSi, Y$_3$Si$_5$, and Y$_5$Si$_3$.

3. The component of claim 1, wherein said intermetallic compound comprises from about 10 to 95 wt. % of said brazed layer.

4. The component of claim 1, wherein said intermetallic compound comprises TaSi$_2$.

5. The component of claim 1, wherein said brazed layer further comprises yttrium.

6. The component of claim 1, wherein said brazed layer has a thickness in the range of from about 2 to 100 microns.

7. The component of claim 1, further comprising:
   a scale layer disposed on said brazed layer.

8. The component of claim 7, wherein said scale layer comprises a complex oxide.

9. The component of claim 7, wherein said scale layer comprises silicon oxynitride.

10. The component of claim 7, wherein said scale layer comprises at least one oxide selected from the group consisting of SiO$_2$ and Ta$_2$O$_5$.

11. The component of claim 7, further comprising:
    an environmental barrier coating disposed directly on said scale layer.

12. The component of claim 11, wherein said environmental barrier coating comprises at least one oxide of an element selected from the group consisting of Ta, Al, Hf, Ti, Zr, Mo, Nb, Ni, Sr, Sc, Y Mg, Si, and the rare earth elements including the lanthanide series of elements.

13. The component of claim 11, wherein said environmental barrier coating comprises at least about 50 mole % AlTaO$_4$.

14. The component of claim 11, wherein said environmental barrier coating comprises tantalum oxide alloyed with from about 4 to 10 mole % La$_2$O$_3$ or tantalum oxide alloyed with from about 1 to 6 mole % Al$_2$O$_3$.

15. The component of claim 11, further comprising:
    a thermal barrier coating disposed on said environmental barrier coating.

16. The component of claim 15, wherein said thermal barrier coating comprises at least one segmented columnar ceramic layer.

17. The component of claim 15, wherein said thermal barrier coating comprises a cubic stabilized zirconia or a cubic stabilized hafnia.

18. The component of claim 15, wherein said thermal barrier coating further comprises:
    a sealant layer disposed on said at least one segmented columnar ceramic layer, and wherein said sealant layer comprises a cubic stabilized zirconia or a cubic stabilized hafnia.

19. The component of claim 1, further comprising:
    an environmental baffler coating disposed directly on said brazed layer.

20. The component of claim 1, further comprising:
    a thermal barrier coating disposed directly on said brazed layer.

21. A component, comprising:
    a silicon-based substrate; and
    a braze-based coating disposed on said silicon-based substrate, wherein said braze-based coating comprises:
    a brazed layer disposed on said silicon-based substrate, the brazed layer comprising an intermetallic compound a dispersion of silicon nitride particles, silicon oxynitride particles, or a mixture thereof;
    an environmental barrier coating disposed on said brazed layer; and
    a thermal barrier coating disposed on said environmental barrier coating, wherein said brazed layer provides a barrier to the diffusion of oxygen therethrough.

22. The component of claim 21, wherein said brazed layer further provides a baffler to the diffusion therein of constituents of said silicon-based substrate.

23. The component of claim 21, wherein:
    said silicon-based substrate comprises silicon nitride,
    said brazed layer is formed by reacting constituents of a braze mixture applied to a surface of said silicon-based substrate,
    said brazed layer is bonded to said surface of said silicon-based substrate and
    wherein said intermetailic compound is selected from the group consisting of TaSi$_2$, Ta$_5$Si$_3$, Ta$_2$Si, MoSi$_2$, Mo$_5$Si$_3$, ScSi, Sc$_5$Si$_3$, YbSi, YbSi$_{1.8}$, Yb$_3$Si$_5$, Yb$_5$Si$_3$, YSi, Y$_3$Si$_5$, and Y$_5$Si$_3$.

24. A component, comprising:
  a silicon-based substrate; and
  a braze-based coating disposed on said silicon-based substrate, wherein said braze-based coating comprises:
    a brazed layer disposed directly on said silicon-based substrate;
    a scale layer disposed on said brazed layer;
    an environmental barrier coating disposed on said scale layer; and
    a thermal barrier coating disposed on said environmental barrier coating,
    wherein said brazed layer comprises an intermetallic compound a dispersion of silicon nitride particles, silicon oxynitride particles, or a mixture thereof, and
    wherein said intermetallic compound is selected from the group consisting of $TaSi_2$, $Ta_3Si_3$, $Ta_2Si$, $MoSi_2$, $Mo_5Si_3$, $ScSi$, $Sc_5Si_3$, $YbSi$, $YbSi_{1.8}$, $Yb_3Si_5$, $Yb_5Si_3$, $YSi$, $Y_3Si_5$, and $Y_5Si_3$.

25. The component of claim 24, wherein said scale layer comprises a material selected from the group consisting of $Si_2ON_2$, $SiO_2$, $Ta_2O_5$, and mixtures thereof.

26. The component of claim 24, wherein said scale layer comprises at least one of $Sc_2SiO_5$ and $Sc_2Si_2O_7$.

27. The component of claim 24, wherein:
  said environmental barrier coating comprises $AlTaO_4$ or $Ta_2O_5$, and
  wherein said thermal barrier coating comprises yttria stabilized zirconia or yttria stabilized hafnia.

28. A protective coating for a silicon-based substrate, comprising:
  a brazed layer; and
  a scale layer disposed on said brazed layer,
  wherein said brazed layer comprises an intermetallic compound having a dispersion therein of silicon nitride particles, silicon oxynitride particles, or a mixture thereof, and
  said intermetallic compound comprises Si and an element selected from the group consisting of Ta, Mo, Sc, Y, and Yb.

29. The coating of claim 28, wherein:
  said brazed layer is disposed directly on said silicon-based substrate,
  said brazed layer is bonded to a surface of said silicon-based substrate, and
  said scale layer comprises an oxide of a constituent of said brazed layer.

30. The component of claim 28, wherein said intermetallic compound comprises from about 10 to 95 wt. % of said brazed layer.

31. The component of claim 28, wherein said intermetallic compound is selected from the group consisting of $TaSi_2$, $Ta_5Si_3$, $Ta_2Si$, $MoSi_2$, $Mo_5Si_3$, $ScSi$, $Sc_5Si_3$, $YbSi$, $YbSi_{1.8}$, $Yb_3Si_5$, $Yb_5Si_3$, $YSi$, $Y_3Si_5$, and $Y_5Si_3$.

32. The component of claim 28, wherein said brazed layer has a thickness in the range of from about 2 to 100 microns.

33. The component of claim 28, further comprising:
  an environmental barrier coating disposed on said scale layer.

34. The component of claim 33, further comprising:
  a thermal baffler coating disposed on said environmental barrier coating.

35. A braze-based composition for joining together two or more ceramic components, comprising:
  from about 10 to 95 wt. % of an intermetallic compound selected from the group consisting of $TaSi_2$, $Ta_5Si_3$, $Ta_2Si$, $MoSi_2$, $Mo_5Si_3$, $ScSi$, $Sc_5Si_3$, $YbSi$, $YbSi_{1.8}$, $Yb_3Si_5$, $Yb_5Si_3$, $YSi$, $Y_3Si_5$, and $Y_5Si_3$, and a dispersion of silicon nitride particles, silicon oxynitride particles, or a mixture thereof, wherein said braze-based composition is formed by reacting constituents of a braze mixture applied to a surface of a substrate, and wherein said braze-based composition is bonded to said surface of said substrate.

36. The braze-based composition of claim 35, wherein said surface of said substrate comprises a surface of a first ceramic component, said braze-based composition comprises a brazed layer, and wherein said brazed layer is used, as a braze, for joining said first ceramic component to a second ceramic component.

37. The braze-based composition of claim 36, wherein at least one of said first and second ceramic components comprises a silicon based component, and wherein said first and second ceramic components are adapted for use at elevated temperatures up to about 2400° F.

* * * * *

UNITED STATES PATENT AND TRADEMARK OFFICE
CERTIFICATE OF CORRECTION

| | |
|---|---|
| PATENT NO. | : 7,115,319 B2 |
| APPLICATION NO. | : 10/682752 |
| DATED | : October 3, 2006 |
| INVENTOR(S) | : Derek Raybould et al. |

It is certified that error appears in the above-identified patent and that said Letters Patent is hereby corrected as shown below:

Column 14, line 55, "baffler" should be changed to --barrier--.

Signed and Sealed this

Twenty-seventh Day of March, 2007

JON W. DUDAS
*Director of the United States Patent and Trademark Office*